United States Patent Office 3,133,913
Patented May 19, 1964

3,133,913
17α-METHYL STEROIDS AND PROCESS TO MAKE SAME
Romano Deghenghi, Westmount, Quebec, Canada, assignor to American Home Products Corporation, New York, N.Y., a corporation of Delaware
No Drawing. Filed Sept. 11, 1961, Ser. No. 137,010
4 Claims. (Cl. 260—239.55)

This invention relates to a new method of preparing steroidal compounds having the formula

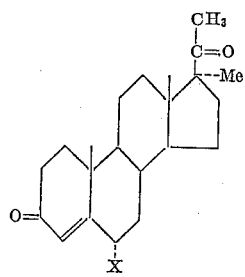

wherein X represents a member of the group consisting of hydrogen and methyl, to new compounds made by this method, and to intermediates useful in the practice of this method. This invention provides a new and improved method of preparing 17α-methyl progesterone, a highly active progestational agent when administered parenterally. It also provides a method of preparing 6α,17α-dimethyl progesterone which is a powerful oral progestational agent, substantially free of androgenic effects, and effective in the maintenance of pregnancy. 6α,17α-dimethyl progesterone may be easily dehydrogenated to 6-dehydro-6,17α-dimethyl progesterone (6,17α-dimethyl-4,6-pregnadiene-3,20-dione) which is a very effective oral progestational agent, substantially free of androgenic action and effective in the maintenance of pregnancy.

In the past, a 17α-methyl progesterone has been available by a rather elaborate synthesis from 3β-hydroxy-17α-methyl - 17β-carbomethoxyandrost-5-ene, involving the steps of (1) vigorous alkaline hydrolysis, (2) elaboration of a Δ⁴-3-ketone moiety, (3) reaction with oxalyl chloride to prepare the corresponding acid chloride, and (4) reaction with dimethyl cadmium to elaborate the conventional steroidal side-chain. In this way, 17α-methyl progesterone has been prepared, and in similar ways the corresponding 17α-methylated corticoids were also obtained.

I have found that 17α-methyl-3β-hydroxy-5-etienic acid methyl ester (1) reacts with an excess of Grignard reagent

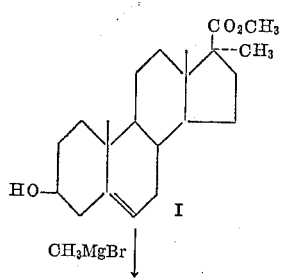

(methyl magnesium bromide) at temperatures of about 50 to about 200° C., to form 17α-methyl pregnenolone (II) in high yield. This is surprising and entirely unexpected because it is well-known that esters normally react with an excess of Grignard reagent to form tertiary carbinols. Small amounts of the expected carbinol (IV) are actually formed in my case, but they are easily

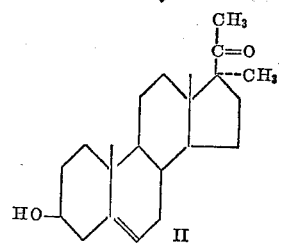

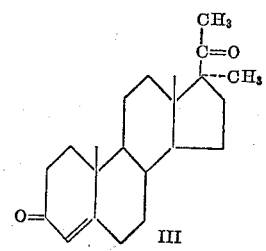

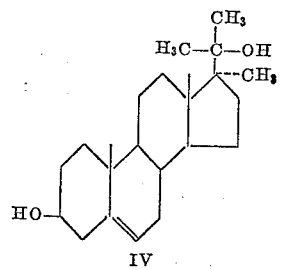

separated from the major reaction product, 17α-methyl pregnenolone (II), which is then, of course, easily converted to 17α-methyl progesterone (III) by the familiar Oppenauer oxidation procedure. If desired, the crude mixture resulting from the Grignard reaction, comprising the desired 17α-methyl pregnenolone and the co-produced tertiary carbinol, may be subjected to Oppenauer oxidation and the oxidized products separated.

My new method may also be used to prepare the corresponding 6-methyl homologs of the foregoing compounds. Thus, compound I may be epoxidized to yield a 5α,6α-epoxide, V, which,

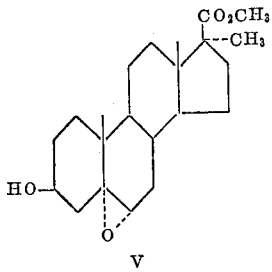

V when treated with the methyl Grignard reagent undergoes methylation simultaneously at the 6- and 20-position to yield 3β,5α-dihydroxy,6β-17α-dimethylpregnane-20-one VI

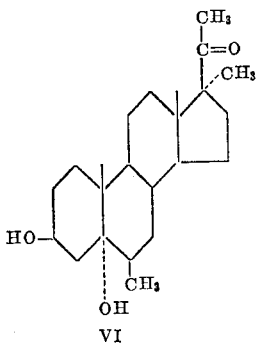

VI plus minor amounts of the tertiary carbinol VII, 3β,5α,20-trihydroxy-6β,17α,20-trimethylpregnane.

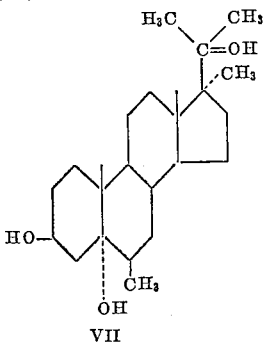

VII

Compound VI may be converted easily to the corresponding 3-keto compound VIII by chromic acid oxidation.

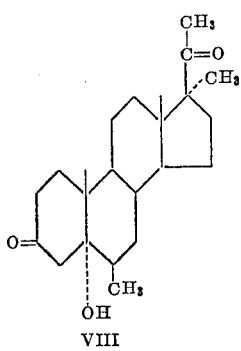

VIII

The latter may be converted to 6β,17α-dimethyl progesterone (IX) by treatment with pyridine and thionyl chloride or to 6α,17α-dimethyl progesterone (X) by treatment with alkali. Either (IX) or (X) may be dehydrogenated with chloranil to yield 6,17α-dimethylpregn-4,6-diene-3,20-dione.

Thus, my new process comprises as its essential step the treatment of 17α-methyl etianic ester such as a 3β-hydroxy-17α-methyl-5-etienic acid lower alkyl ester (I) or its 5α,6α-epoxide (V) with an excess of a methyl Grignard reagent at a temperature of about 50° C. to about 200° C.; surprisingly, this treatment results in the formation in good yields of steroidal 20-ketones instead of the 20-methyl tertiary 20-carbinols which would ordinarily be the expected chief products.

This Grignard reaction may be conveniently effected by adding a diethyl ether solution of a methyl Grignard reagent, which may be methyl magnesium chloride, methyl magnesium bromide, or methyl magnesium iodide to a solution of the etianic ester in a suitable higher-boiling inert solvent such as tetrahydrofurane, benzene, dioxane, toluene, xylene, anisole, phenetole, a naphthyl methyl ether, etc., heating the mixture to distill off the diethyl ether, and raise the temperature of the reaction mixture to the desired level. Heating longer than about one or two hours does not appear to improve the yield appreciably.

The following examples, which are intended to be illustrative only, show how my invention may be practiced.

*Example I*

To methyl-3β-hydroxy-17α-methyl-Δ⁵-etienate [Pl. Plattner, Helv. Chim. Acta 31, 603 (1948)] 0.500 g. dissolved in 30 ml. dry benzene, there is added 10 ml. of a 3 M solution of CH₃MgBr in ether. Solvent is distilled off until the temperature of the liquid reached 70° C., and the mixture is then refluxed with stirring, under N₂, for 3.5 hours. A saturated solution of ammonium chloride is added to stop the reaction, and the mixture subsequently extracted with ether, washed with approx. 1 N hydrochloric acid or 10% sulfuric acid, approx. 1 N sodium hydroxide solution and water, to give, after drying and removal of the solvent, 0.410 g. of a crystalline solid representing a mixture of 17α-methyl pregnenolone and 3β,20-dihydroxy-Δ⁵-bisnorcholane. 17α-methyl pregnenolone is purified by crystallization or chromatography or through the corresponding 3-acetate, and isolated in about 60–70% yield.

Alternatively the crude mixture may be oxidized in presence of aluminum isopropoxide and cyclohexanone (Oppenauer oxidation) and the products separated by chromatography as illustrated in the following example.

*Example II*

A solution of 1.00 g. of the crude 17α-methyl pregnenolone (Example 1) in 50 cc. toluene is refluxed in the presence of 12 ml. cyclohexanone and 0.6 g. aluminum isopropoxide for one hour. A saturated Rochelle salt solution is added, the organic solvents eliminated by steam distillation and the residue taken up in methylene chloride to give 1.0 g. of crude substance which is chromatographed on 30 g. neutral alumina.

Petroleum ether-benzene (1:1) elutes 0.7 g. of crystalline 17α-methylprogesterone, M.P. 132–135° C.

Further eluates contain the by-product 17α,20-dimethyl-20-hydroxy-4-pregnene-3-one, M.P. 228–232° C., which, surprisingly, shows progestational activity.

*Example III*

A solution of 10.0 g. of 3β-hydroxy-17α-methyl-5-etienic acid methyl ester in 20 cc. of chloroform was added dropwise, with stirring, while the temperature was being held between —2° and +2° C., to a mixture of 1.0 g. anhydrous sodium acetate and 10 cc. of a 40% solution of peracetic acid. The mixture was stirred for an additional two and one-half hours at 0° C., than extracted with chloroform, washed to neutrality with aqueous sodium bicarbonate solution and water, dried, the solvent evaporated to give 10.8 g. of a residue which was crystallized from methanol to give 6.0 g. of crystals, M.P. 167–172° C., representing the 3β-hydroxy-17α-methyl-5α,6α-epoxy-etianic acid, methyl ester.

A sample was recrystallized for analysis, M.P. 170–

171° C., [α]$_D$ −67.2 (1% in chloroform). Elemental analysis confirmed the assigned identity.

*Example IV*

To a solution of 2.0 g. of 3β-hydroxy-5α,6α-epoxy-17α-methyl-etianic acid methyl ester (V), M.P. 170–171° C., [α]$_D$ −67.2 (CHCl)$_3$ in 120 ml. dry benzene there was added 45 ml. of a 3 M solution of methyl magnesium bromide in ether. The mixture was allowed to react as described in Example 1. The same working up gave 1.95 g. of a crystalline product, M.P. 188–192° C., consisting mainly of 3β,5α-dihydroxy-6β,17α-dimethyl-pregnane-20-one (VI), which could be purified by chromatography or, alternatively, oxidized to VIII as in Example V.

*Example V*

To a solution of 840 mg. of crude 3β,5α-dihydroxy-6β,17α-dimethylpregnane-20-one (VI) in 45 ml. pure acetone, there was added, while stirring at 0° C., 2.5 ml. of an 8 N chromic acid solution. Stirring was continued for three minutes, the mixture was extracted with ether, washed with NaHCO$_3$ solution and water to neutrality, the organic solvent evaporated to give 800 mg. of a crystalline product, M.P. 230–233° C., representing crude 5α-hydroxy-6β,17α-dimethyl-pregnane-3,20-dione (VIII) which is conveniently converted to the corresponding 6β,17α- or 6α,17α-dimethyl-progesterone as described in the following examples (VI) and (VII).

*Example VI*

To a solution of 565 mg. of 5α-hydroxy-6β,17α-dimethyl-pregnane-3,20-dione (VIII) in 10 ml. of pyridine, there was added at 0° C. while stirring, 0.6 ml. of thionyl chloride. After ten minutes the mixture was extracted with ether, washed to neutrality with 1 N HCl and NaHCO$_3$ solution, the solvent evaporated to give 400 mg. of an oil which crystallized from ether to give a product, M.P. 118–126° C., representing crude 6β,17α-dimethyl-progesterone (IX).

*Example VII*

To a suspension of 770 mg. of 5α-hydroxy-6β,17α-dimethyl-pregnane-3,20-dione (VIII) in 50 ml. methanol, there was added 2.5 ml. of a 5% NaOH solution in water. The mixture was refluxed under nitrogen for one hour, acidified with acetic acid, and evaporated to a residue which was taken up in ether, washed to neutrality with NaHCO$_3$ solution and water. Evaporation of the solvent gave 746 mg. of an oil which was chromatographed on neutral alumina. Petroleum ether-benzene (4:1) eluted crystalline fractions of 6α,17α-dimethyl-progesterone (X), M.P. 137–140° C. (ether). λ max. 239 mμ, ε=16,000.

Alternatively, 6β,17α-dimethyl-progesterone (IX) could be epimerized to 6α,17α-dimethyl-progesterone (X) by conventional acid or alkaline treatment. Further eluates contained the by-product 6α,17α,20-trimethyl-20-hydroxy-4-pregnene-3-one, M.P. 175–178° C., which has progestational activities.

*Examples VIII to XXI*

These examples, summarized in the following table, show how to yield a 17α-methyl pregnenolone (II) is affected in preparation conducted along the lines of Example 1 by variations of reaction solvent, temperature, time, molar excess of Grignard reagent.

| Expt. No. | Solvent | Temp., °C. | Time, hrs. | Mols CH$_3$-MgBr per mol of steroid (I) | Percent conversion of I to II |
|---|---|---|---|---|---|
| VIII | Tetrahydrofurane | 65 | three | 20 | 40 |
| IX | ----do---- | 65 | six | 20 | 40 |
| X | Dioxane | 100 | three | 10 | 70 |
| XI | ----do---- | 100 | ---do---- | 20 | 70 |
| XII | Toluene | 110 | one | 20 | 60 |
| XIII | ----do---- | 110 | three | 20 | 70 |
| XIV | ----do---- | 110 | ---do---- | 10 | 70 |
| XV | ----do---- | 110 | ---do---- | 5 | 60 |
| XVI | ----do---- | 110 | sixteen | 20 | 60 |
| XVII | Xylene | 135–40 | one | 20 | 70 |
| XVIII | ----do---- | 135–40 | ---do---- | 10 | 70 |
| XIX | Anisole | 150 | one | 20 | 75 |
| XX | ----do---- | 150 | ---do---- | 10 | 75 |
| XXI | ----do---- | 150 | ---do---- | 5 | 75 |

*Example XXII*

To a solution of 2.0 g. of 6α,17α-dimethyl-progesterone in 60 ml. isobutanol there was added 1.6 g. of chloranil. The resulting suspension was refluxed for ten hours, then extracted with ether, washed with 10% NaOH solution and water, dried, the organic solvent evaporated to give 1.8 g. of a yellow oil which crystallized upon addition of ether. One recrystallization gave 6,17-dimethyl-4,6-pregnadiene-3,20-dione, M.P. 138–140° C., needles from ether. λ max. 290 mμ, ε 25,000.

I claim:

1. The process of preparing 17α-methylpregnenolone which comprises the steps of adding a solution of a methyl magnesium halide to a solution of 3β-hydroxy-17α-methyl-Δ$^5$-etienic acid methyl ester in an inert solvent, raising the temperature of the resulting reaction mixture to from about 50 to about 200° C., and thereafter recovering 17α-methylpregnenolone from the reaction mixture.

2. The process of preparing 3β,5α-dihydroxy-6β,17α-dimethylpregnane-20-one which comprises the steps of adding a solution of a methyl magnesium halide to a solution of 3β-hydroxy-5α,6α-epoxy-17α-methyl-etianic acid methyl ester in an inert solvent, raising the temperature of the resulting reaction mixture to from about 50 to about 200° C., and thereafter recovering 3β,5α-dihydroxy-6β,17α-dimethylpregnane-20-one from the reaction mixture.

3. 6,17α-dimethyl-4,6-pregnadiene-3,20-dione.

4. 3β-hydroxy-5α,6α-epoxy-17α-methyl etianic acid methyl ester.

References Cited in the file of this patent

UNITED STATES PATENTS

| | | |
|---|---|---|
| 2,601,168 | Plattner | June 17, 1952 |
| 2,891,079 | Dodson et al. | June 16, 1959 |
| 2,970,156 | Lincoln et al. | Jan. 31, 1961 |
| 2,983,736 | Georgian et al. | May 9, 1961 |

OTHER REFERENCES

Miramontes et al.: J.A.C.S., vol. 82 (1960), pages 6153–55.

Fieser and Fieser: Steroids, Reinhold Publ. Co., New York, 1959, page 563.